United States Patent Office 3,069,260
Patented Dec. 18, 1962

3,069,260
MANUFACTURE OF COPPER STRIP
Robert Stuckey Baker, Torrington, Conn., assignor to Anaconda American Brass Company, a corporation of Connecticut
No Drawing. Filed Feb. 24, 1960, Ser. No. 10,546
4 Claims. (Cl. 75—211)

This invention relates to the manufacture of copper strip having a high annealing temperature and, more particularly, to the production of such strip from an iron-containing copper powder derived from a metallic iron-bearing copper such as cement copper or copper scrap. The invention provides an improved process for manufacturing copper strip and is based on the discovery that an iron-containing copper powder in which there is dispersed a predetermined controlled amount of metallic iron, and which may be processed through a conventional powder rolling mill to produce an iron-bearing copper strip or sheet having high annealing temperature and excellent corrosion resistance, may be produced via the hydrogen reduction of an ammoniacal solution of copper containing finely divided metallic iron as an impurity.

By using a copper powder which is prepared by leaching a metallic iron-bearing copper, such as cement copper or iron-contaminated copper scrap, with an aqueous ammoniacal solution to dissolve the copper and form an ammoniacal copper-rich solution in such manner that the solution retains an amount of finely dispersed metallic iron in the range from 0.02 to 0.3 percent by weight (based on the weight of the copper in the solution), and then treating such solution at an elevated temperature with hydrogen under pressure to precipitate the copper in the form of metallic powder, it is possible to directly produce an iron-bearing copper powder suitable for compacting into high annealing, corrosion-resistant wrought copper shapes more economically than by other means.

Accordingly, the invention contemplates an improved process for manufacturing wrought copper (strip, for example) having a high annealing temperature which comprises leaching a metallic iron-bearing copper with an aqueous ammoniacal solution to dissolve the copper and form an ammoniacal copper-rich solution, separating the solution from the bulk of the undissolved residue while retaining with the separated solution an amount of finely dispersed metallic iron in the range from 0.02 to 0.3 percent by weight (based on the weight of the copper in solution), treating the solution with gaseous hydrogen to precipitate copper in metallic powder form from the solution, separating such copper powder admixed with the finely dispersed metallic iron from the residual solution, compressing the powder to form a compacted bar, and sintering and rolling the compacted bar to produce an iron-bearing wrought copper shape having a high annealing temperature. Copper strip produced in accordance with the process of the invention may be employed with advantage in the fabrication of radiators, heat exchangers, air-conditioning units, or in any application where the retention of work-hardening is desired at a temperature somewhat above that at which pure copper undergoes recrystallization.

To prepare the iron-containing copper powder from which copper strip is rolled in accordance with the invention, a metallic iron-bearing copper from such sources as cement copper or other iron-contaminated copper scrap, is leached with an aqueous ammoniacal solution containing ammonium carbonate to preferentially dissolve the copper, nickel, and zinc. Although iron does not dissolve in aqueous ammonia, the copper-rich ammoniacal solution retains an amount of finely dispersed metallic iron. By limiting the extent to which such iron is separated when the solution is clarified, a copper-bearing solution containing dispersed metallic iron in the range from 0.02 to 0.3 percent by weight, based on the weight of the copper contained in such solution, can readily be produced.

The ammoniacal copper-rich solution with the iron dispersed therein is then treated with gaseous hydrogen at a temperature of about 350° F. and at a pressure of about 1000 pounds per square inch, as a result of which the copper ammonium complex is reduced and metallic copper powder is precipitated from the solution, while most of the nickel and zinc remain dissolved. Hydrogen treatment is continued until at least 65 percent by weight of the copper contained in the solution is precipitated in the form of metallic powder. The copper precipitate, which is admixed with the metallic iron originally present, is suitably separated from the residual solution, washed, and dried under a reducing or at least non-oxidizing atmosphere, preferably at a temperature in the range from about 800° F. to about 900° F. The resulting powder is dendritic and has excellent compacting properties.

Copper strip may be produced from this powder in a conventional powder rolling mill, using the standard techniques of powder metallurgy employed in such mills. In such a mill, the powder is introduced between a pair of compacting rolls where it is roll-bonded to form a compacted bar. The compacted bar is then sintered in a reducing atmosphere, such as gaseous hydrogen, at a temperature from about 1900° F. to about 2000° F., at which temperature the powder particles interdiffuse at their points of contact. The sintered bar is then rolled into a strip or sheet of the desired gauge. Instead of rolling into strip, the copper powder may be otherwise compacted (by extension, for example) and may be worked into other wrought shapes such as tubes, rods and wire. The finished strip of iron-bearing copper possesses a high annealing temperature and excellent corrosion resistance.

The following example of a preferred embodiment is illustrative of the effectiveness with which a metallic iron-bearing copper can be produced and converted into a copper strip having a high annealing temperature in accordance with the process of the invention:

Cement copper was produced by precipitating metallic copper, by means of scrap iron, from the acidic aqueous leach solution resulting from leaching an oxidized copper ore with sulfuric acid. The cementation precipitate thus produced analyzed 84.2 percent by weight of copper, 0.7 percent by weight of zinc, 2.2 percent by weight of iron, 0.9 percent by weight of tin, 1.0 percent by weight of lead, with the remainder consisting essentially of insolubles. It was leached with an aqueous ammoniacal solution (recirculated leaching solution) containing ammonium carbonate to form an ammoniacal copper-rich solution containing about 140 grams per liter of copper in which much of the metallic iron and insoluble impurities were dispersed. The solution was centrifuged and the supernatant then filtered to remove most of the insolubles. By suitably limiting the extent to which these impurities were removed, however, a clarified solution containing about 0.1% to 0.2% metallic iron (based on the weight of copper present) was produced.

This copper-rich filtrate was passed through a series of heat exchanges, where it was heated under pressure to a temperature of about 350° F., and the hot solution was then charged to an autoclave and treated for a period of about one hour with gaseous hydrogen at a presure of about 1000 pounds per square inch, during which time the dissolved copper was reduced and precipitated in the form of a fine metallic powder. After centrifuging the reduced solution, the separated copper precipitate with which much of the metallic iron remained admixed was washed with water; and the residual solution, which contained about 50 grams per liter of dissolved copper, was treated with make-up ammonia and then recirculated to the ammoniacal leaching operation.

The iron-bearing copper precipitate was then dried by moving it through a furnace under an atmosphere of hydrogen at a temperature of about 900° F., the dried precipitate emerging in the form of bright copper lumps and fines. The dry precipitate was crushed to break up lumpy agglomerates, and then air classified to produce a uniformly fine dendritic powder having an apparent density of about 2.5 and of particle sizes such as to be 100% minus 60 mesh and 60% minus 325 mesh (Tyler screen series). Spectral analysis of the copper powder showed it to contain about 0.1 percent by weight of iron, the balance essentially all copper.

The copper powder thus produced was transferred to the feed hopper of a conventional powder rolling mill, the roll axes of which are in a horizontal plane, and thence through the compacting rolls to roll-bond the powder into a compacted bar. The compacted bar then entered a sintering furnace maintained at a temperature of 1950° F. where it was sintered under an atmosphere of gaseous hydrogen, while slowly traversing the length of the furnace. (Sintering generally requires a period in the range from ¼ to 2 hours.) Sintering of the compacted bar interdiffuses the powder particles at their points with the result that the density and strength of the bar is notably increased.

Upon leaving the sintering furnace, the sintered bar was hot rolled to compact it further, and then was cold-rolled to the desired finished gauge. The strip was found to have a high annealing temperature and possessed excellent corrosion resistance. It was eminently suitable for use in manufacturing products which require soldering or tinning at temperatures which would cause ordinary copper and brass alloys to become annealed and lose much of the strength developed by cold working.

Copper strip produced in accordance with the process of the invention possesses a much higher annealing temperature than strip which is produced from pure copper. For example, copper strip produced from copper powder prepared in accordance with the invention and containing 0.02 to 0.2 percent by weight of iron has an annealing temperature about 35° F. to 275° F. higher than that of strip produced from pure copper, which is about 600° F.

Although the preferred embodiment described above relates to the manufacture of rolled strip or sheet, the process of the invention is equally applicable to the fabrication of other wrought articles.

I claim:

1. A process for manufacturing wrought copper having a high annealing temperature which comprises leaching a metallic iron-bearing copper with an aqueous ammoniacal solution to dissolve the copper and form an ammoniacal copper-rich solution containing finely dispersed metallic iron, separating said solution from the bulk of the undissolved residue while retaining with the separated solution an amount of said finely dispersed metallic iron in the range from 0.02 to 0.3 percent by weight based on the weight of the copper in solution, treating the solution with gaseous hydrogen to precipitate copper in metallic powder form from the solution, separating such copper powder admixed with the finely dispersed metallic iron from the residual solution, compressing the powder to form a compacted bar, and sintering and rolling the compacted bar to produce an iron-bearing wrought copper shape having a high annealing temperature.

2. A process for manufacturing copper strip having a high annealing temperature which comprises leaching an iron-bearing cement copper with an aqueous ammoniacal solution to dissolve the copper and form an ammoniacal copper-rich solution containing finely dispersed metallic iron, separating said solution from the bulk of the undissolved residue while retaining with the separated solution an amount of said finely dispersed metallic iron in the range from 0.02 to 0.3 percent by weight based on the weight of the copper in solution, treating the solution with gaseous hydrogen to precipitate copper in metallic powder form from the solution, separating such copper powder admixed with the finely dispersed metallic iron from the residual solution, roll bonding powder to form a compacted bar, and sintering and rolling the compacted bar to produce an iron-bearing copper strip having a high annealing temperature.

3. A process for manufacturing wrought copper having a high annealing temperature which comprises leaching a metallic iron-bearing copper with an aqueous ammoniacal solution to dissolve the copper and form an ammoniacal copper-rich solution containing finely dispersed metallic iron, separating said solution from the bulk of the undissolved residue while retaining with the separated solution an amount of said finely dispersed metallic iron in the range from 0.03 to 0.3 percent by weight based on the weight of the copper in solution, treating the solution with gaseous hydrogen to precipitate at least 65 percent by weight of the copper and iron from the solution in the form of metallic powder, separating such copper powder admixed with from 0.02 to 0.2 percent by weight of finely dispersed metallic iron from the residual solution, compressing the powder to form a compacted bar, and sintering and rolling the compacted bar to produce an iron-bearing wrought copper shape having a high annealing temperature.

4. A process for manufacturing copper strip having a high annealing temperature which comprises leaching an iron-bearing cement copper with an aqueous ammoniacal solution to dissolve the copper and form an ammoniacal copper-rich solution containing about 140 grams per liter of copper and finely dispersed metallic iron, separating said solution from the bulk of the undissolved residue while retaining with the separated solution an amount of said finely dispersed metallic iron in the range from 0.02 to 0.3 percent by weight based on the weight of the copper in solution, treating the solution with gaseous hydrogen to precipitate at least 65 percent by weight of the copper and iron from the solution in the form of metallic powder, separating such copper powder admixed with from 0.02 to 0.2 percent by weight of finely dispersed metallic iron from the residual solution, roll bonding the powder to form a compacted bar, and sintering and rolling the compacted bar to produce an iron-bearing copper strip having a high annealing temperature.

References Cited in the file of this patent

UNITED STATES PATENTS

| 2,754,193 | Graham | July 18, 1956 |
| 2,814,564 | Hayden | Nov. 26, 1957 |

OTHER REFERENCES

Gregg and Daniloff: "The Alloys of Iron and Copper," 1st. ed., 1934, page 397. (Copy in Div. 3.)